United States Patent
Zhang et al.

(10) Patent No.: US 8,068,439 B2
(45) Date of Patent: Nov. 29, 2011

(54) METHOD OF CONCURRENT MULTIPATH TRANSFER BASED ON RELATIONAL PATHS

(75) Inventors: Hongke Zhang, Beijing (CN); Chang Liu, Beijing (CN); Dong Yang, Beijing (CN); Ping Dong, Beijing (CN); Yajuan Qin, Beijing (CN); Huan Yan, Beijing (CN); Liang Sun, Beijing (CN)

(73) Assignee: Beijing Jiaotong University, Beijing (CN)

(*) Notice: Subject to any disclaimer, the term of this patent is extended or adjusted under 35 U.S.C. 154(b) by 84 days.

(21) Appl. No.: 12/490,425

(22) Filed: Jun. 24, 2009

(65) Prior Publication Data

US 2010/0226265 A1 Sep. 9, 2010

(30) Foreign Application Priority Data

Mar. 5, 2009 (CN) .......................... 2009 1 0078888

(51) Int. Cl.
*H04L 1/00* (2006.01)
*H04L 12/26* (2006.01)
*H04L 12/28* (2006.01)
*H04L 12/56* (2006.01)
*H04J 3/26* (2006.01)

(52) U.S. Cl. ......... 370/252; 370/236; 370/389; 370/432

(58) Field of Classification Search .................. 370/235, 370/236, 252, 389, 432
See application file for complete search history.

(56) References Cited

U.S. PATENT DOCUMENTS

| 2005/0281243 | A1* | 12/2005 | Horn et al. ..................... 370/345 |
| 2007/0133414 | A1* | 6/2007 | Krishna et al. ................ 370/235 |
| 2007/0168826 | A1* | 7/2007 | Terry et al. .................... 714/748 |
| 2008/0062879 | A1* | 3/2008 | Sivakumar et al. ........... 370/235 |
| 2008/0144504 | A1* | 6/2008 | Marcondes et al. .......... 370/235 |

OTHER PUBLICATIONS

Iyengar, et al, "Concurrent Multipath Transfer Using SCTP Multihoming Over Independent End-to-End Paths," IEEE/ACM Transactions on Networking, (vol. 14, No. 5), (p. 951-964), (Oct. 2006).

* cited by examiner

*Primary Examiner* — Ronald Abelson
(74) *Attorney, Agent, or Firm* — Hammer & Associates, P.C.

(57) ABSTRACT

A method of Concurrent Multipath Transfer which is based on the relational paths, characterized in that for a packet lost in a path, it allows other packets sent from the path and/or other paths to point out the lost packet through a gap report. According to the present invention, any lost packets and abnormal paths can be found as fast as possible, and can be retransmitted quickly. So this method can avoid the failure of all paths from handing in packets to upper layer only for the abnormity in one path, which limits the speed of whole association.

4 Claims, 3 Drawing Sheets

METHOD OF CONCURRENT MULTIPATH TRANSFER BASED ON RELATIONAL PATHS

TECHNICAL FIELD

This invention relates to a method of Concurrent Multipath Transfer (CMT) based on relational paths, which belongs to the Technical Field of Computer Network.

PRIOR ART

Because of global superiority of the Transmission Sequence Number (TSN), when multiple paths are used to transmit packets at the same time, the difference of transmission delay among each path will generate the problem that the received TSN is out of order in the receiver. When packets are handed in, it will cause mutual restriction among multiple paths.

Aiming at the disorder problem of packets among multiple paths, most existing implementation scheme of CMT use Split Fast Retransmit (SFR) to resolve it.

The core of SFR algorithm is that only when the packets are sent in the same path, can it point out the lost packet and increase the lost gap counter.

The problem of SFR algorithm is that the algorithm makes the transmissions among paths independently, but the buffer in the receiver is still exclusive. In normal case, packets received in receiver need to submit in order. Any lost packet will cause failure in handing in upper layer of other packets after the lost packet. And regardless of whether the packets belong to the same transmission path, it must wait for the previous packet integrity before submission.

As to the reason of this problem, when the multiple paths are used to transmit, the transmission of each path is relatively independent, but because the packets belong to the same information, they generate the submit relationship of relative constraints in original independent path. So, only to make path transmission relatively independent during the transmission cannot make all paths to work as a single path transmission.

SUMMARY OF THE INVENTION

The purpose of this invention is to provide a method of CMT based on the relational paths, in which lost packets and abnormal paths can be found as fast as possible, and it will retransmit the lost packets quickly, so as to avoid all paths from failing to hand in packets to upper layer only for the abnormity in one path, which limits the speed of whole association.

Accordingly, there is provided a method of CMT based on the relational paths, characterized in that for a lost packet in a path, it is allowed other packets sent from the path or other paths to point out the lost packet through a gap report.

When using CMT, because the receiver buffer is unique, the lost packet must be found as soon as possible for retransmission, to avoid all paths from failing to hand in packets to upper layer only for the abnormity in one path, which causes the blocking of receiver's head-of-line blocking and limits the speed of whole association.

Allowing pointing out the lost packet among paths can make a lost packet to be found as soon as possible. The improved mechanism of fast retransmit can decrease the number of unnecessary fast retransmit. The equivalent mechanism between fast retransmit and timeout retransmit can solve the problem that the improved fast retransmits may be done instead of timeout retransmit.

BRIEF DESCRIPTION OF ACCOMPANYING DRAWINGS

BEST MODE OF CARRYING OUT THE INVENTION

According to this invention, for the problem of packets disorder between paths, paths are allowed to point out lost packet mutually and generate one or more gap reports.

Figure 1:
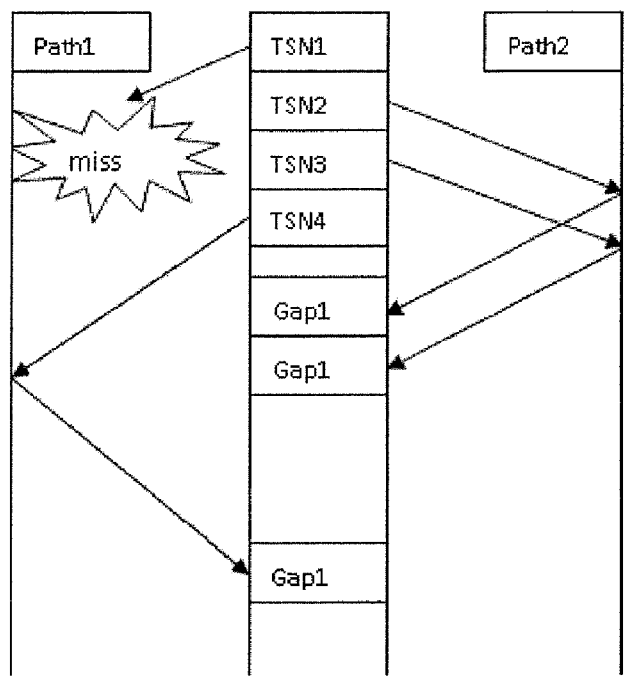
FIG. 1 is the schematic diagram of paths pointing out lost packet mutually in this invention.

For example, in FIG. 1, TSN1 is lost in path1, TSN2 and TSN3, which are sent in path2, can also point out TSN1 is a lost packet though a gap report.

It is one of embodiments that when receiving a Selective Acknowledgement (SACK) with one gap report, it is to:
(1) find out the lost TSN number $T_m$ which is pointed out by the gap report; and
(2) increase the lost report counter of $T_m$.

After allowing paths to point out lost packets mutually, there will be plenty of gap reports because of the performance difference between paths. But many of the gap reports are caused by the temporary packet lacking resulted from the different delay between paths, instead of losing.

Figure 2:
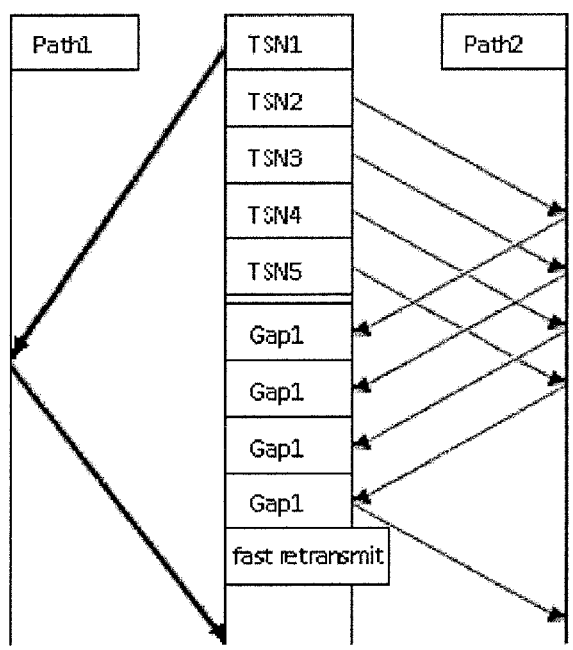
FIG. 2 is the schematic diagram of unnecessary fast retransmits.

When the difference between path delays is large enough, it may lead to unnecessary fast retransmit. FIG. 2 is an example of unnecessary fast retransmits. The difference between path delays is large, before TSN1, being sent in path1, reaches receiver, TSN2,3,4,5, being sent in path2, all reach receiver respectively, and generate a gap report based on TSN1. The sender receives 4 SACK with continuous gap reports of TSN1, so TSN1 is deemed to a lost packet by sender, and triggers retransmit. But in fact, TSN1 is not lost in path1, only for its large delay. Now, there is an unnecessary fast retransmit.

To avoid the unnecessary fast retransmit, a condition of opening fast retransmit function is added. Only when the sending time of a packet is larger than one threshold, can it be deemed that it maybe a lost packet, and after that time the packet can trigger fast retransmit.

When the sending time is several times larger than the average round-trip time, it is allowed to trigger fast retransmit.

In an embodiment, if the sender receives several continuous gap reports, for example, more than 3 times, it doesn't trigger fast retransmit immediately. Instead, it delays the fast retransmit to the time when fast retransmit function is opened, and at that time, it needn't more gap reports.

If a path hasn't received any SACK for a long time, it may be already broken. If, before the sending timer expires, the sender has received gap reports from the path, it indicates the path isn't broken, so the sender can use the original path to do fast retransmit; on the other hand, if it hasn't received any gap report from the path, it indicates the lost packet is possibly caused by path broken. So in order to fast retransmit the packet successfully to avoid receiver's head-of-line blocking, the path can be changed to do retransmit. Changing path retransmit is only for this lost packet, without effect of other packets.

Figure 3:
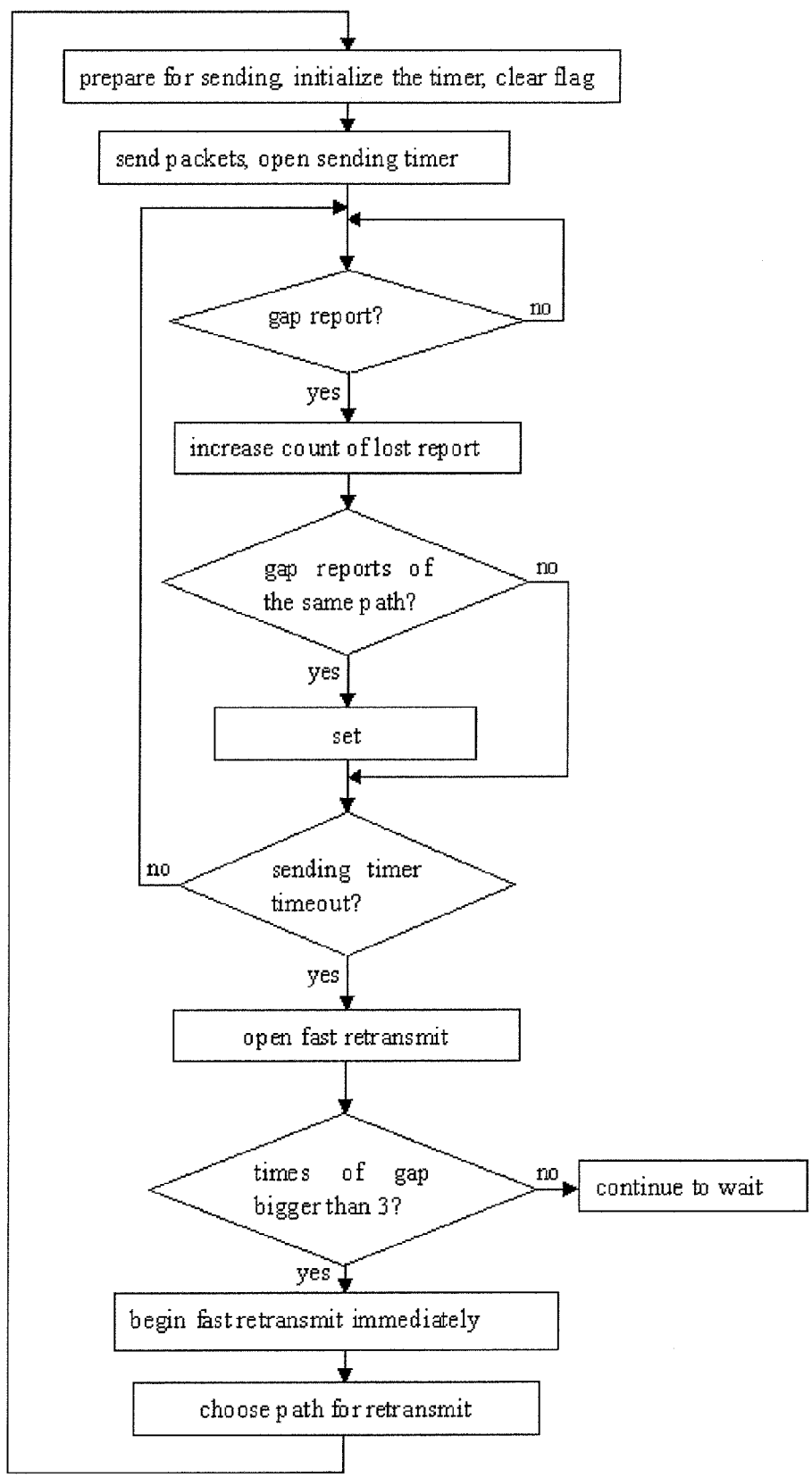
FIG. 3 is the schematic diagram of improved fast retransmits in this invention.

As shown in FIG. 3, sending packets, before receiving an acknowledge report of the packet, the algorithm flow is as following steps:

(1) Prepare for sending (transmitting or retransmitting). Add packets to out queue. Initialize the information and sending timer of packets. Clear the function open flag of fast retransmit and the flag of gap report of the same path.

(2) Send packets. Open sending timer. Set the expiring time of sending timer.

(3) If receiving the gap report of this packet when waiting, increase the lost report counter.

(4) Judge whether the gaps belong to the same path or not. If yes, set the flag of gap report of the same path to 1.

(5) When sending timer expires, open the function of fast retransmit, set the function open flag of fast retransmit.

(6) Judge whether the current lost report counter is with a flag which is bigger than 3. If Yes, do fast retransmit immediately, then return to step 1; if not, continue to wait until timeout of sending.

(7) In the process of fast retransmit, if the flag of gap report of the same path is set to 1, use primary path to retransmit the packet; if the flag of gap report of the same path is 0, then handover to other paths when retransmitting packets.

(8) After sending packets, whenever receiving the acknowledgement of this packet, close the sending timer of this packet, clear the function open flag of fast retransmit, clear the lost report counter, and clear the flag of gap report of the same path.

According to the fast retransmit mechanism in this invention, unnecessary fast retransmit can be avoided. For example, TSN2~5 continuously points out for 4 times that TSN1 is missing. But the sending timer hasn't expired, so fast retransmit function doesn't open. Before the sending timer expires, the sender receives a acknowledge report of TSN1. So the 4 gap reports are abandoned, and unnecessary fast retransmit is avoided.

On the other hand, even if TSN5 continuously points out TSN1 is lost for the 4$^{th}$ time, fast retransmit isn't triggered immediately because the sending timer hasn't expired. When sending timer expires, the fast retransmit function is opened. In that time, there are already more than 3 gap reports of TSN1, so fast retransmit is triggered immediately.

According to this invention, the fast retransmit mechanism allows paths to point out lost packets mutually, and it allows fast retransmit to be triggered by other paths. It makes that waiting for timeout is not the only thing a sender can do, when a path is broken. Before timeout, if the fast retransmit conditions can be satisfied, it is possible for fast retransmit to cover timeout retransmit. But because the mechanism of closing path is based on timeout retransmit, timeout retransmit being covered may lead to the failure of a path's normal close.

Against the problem of timeout being covered, an equivalent mechanism between fast retransmit and timeout retransmit is added. When sender hasn't received any ACK from a path, 3 times of continuous fast retransmit will be equivalent to the treatment of one sending timeout.

Figure 4:
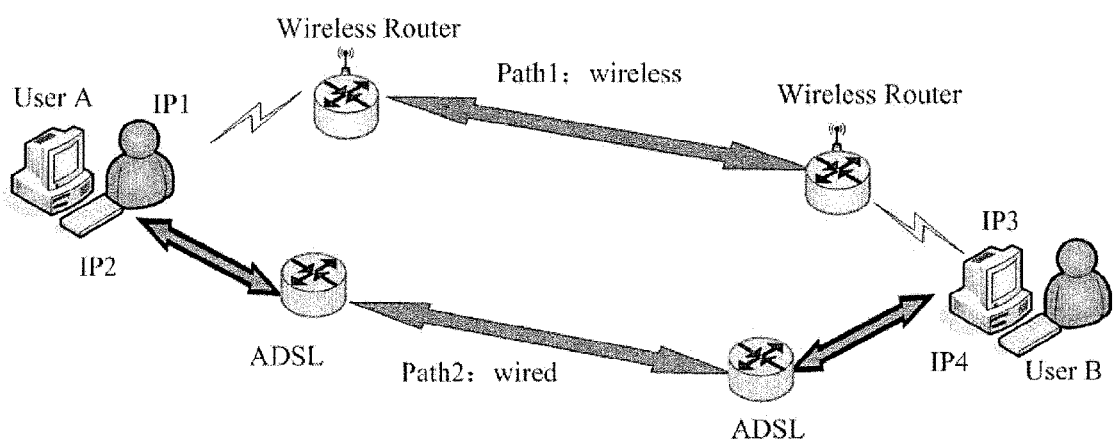
FIG. 4 is the schematic diagram of an embodiment of this invention.

As shown in FIG. 4, there are two network endpoints: A and B, each of which has two network cards. These are wired network card and wireless network card, and both of the two endpoints use SCTP to support the multihoming characteristic. User A has address IP1 corresponding the wireless network card and address corresponding the wired network card. User B also has address IP3 corresponding the wireless network card and address corresponding the wired network card.

Step 1: User A and user B establish an association through a four-way handshake.

Step 2: Choose the wireless address group IP1 and IP3, and establish the wireless path 1.

Step 3: Choose the wired address group IP2 and IP4, and establish the wired path 2.

Step 4: Confirm the number of packets which they can send based on the rwnd and cwnd. Choose the transmission path for each transmission packet base on the Fastest-Path-First principle.

Step 5: Send packet, and open the sending timer.

Step 6: If a received SACK doesn't have gap reports, it updates the rwnd and cwnd of path according to the SACK, and then returns to step 4.

Step 7: If a received SACK has gap reports judge whether to increase the count of lost report and update the rwnd and cwnd according to the SCTP, then return to step 4.

Step 8: If sending timer of some packet is expired, judge whether it satisfies the retransmit condition which the count of lost packets is bigger than 3. If yes, it will trigger the fast retransmit. Then choose the path for packets according to the mechanism of retransmit path choosing.

Step 9: After fast retransmit, reset sending timer, and increase continuous fast retransmit counter.

Step 10: If sending some packet is timeout, when retransmitting the lost packet, handover other paths, and reset sending timer.

Step 11: If the counting value of continuous fast retransmit counter is bigger than 0 and is multiples of 3, process it as timeout of sending.

Step 12: Each time receiving the SACK, clear the continuous fast retransmit counter of this path.

Application Analysis:

When using path1 and path2 to do concurrent transfer, the performance of wired path2 is obvious better than that of wireless path1. Because of allowing paths to point out lost packets mutually, and the round-trip time of wired path2 has obvious advantage, there will be frequent gap reports aimed at wireless path1. At this time, the improved fast retransmit mechanism can avoid unnecessary fast retransmit, and the system can also find lost packets in a short time. If not allowing paths to point out lost packets mutually (such as SFR), a lost packet in path1 is only allowed to be pointed out by the same path packets. It is said it must wait the ACKs of subsequent packets to form that wireless path, Instead, if allowing paths to point out lost packets mutually, a lost packet in path1 can be pointed out faster by the ACKs of the wired path2. Now, the lost packet only needs to wait the sending timer expire to trigger fast retransmit. So fast retransmit can be triggered faster, and then it can avoid receiver buffer blocking. Especially, when wireless path is broken suddenly, the improved fast retransmit mechanism makes the sender unnecessary to wait a long time of timeout, instead fast retransmit triggers more quickly. And because of the equivalent mechanism between fast retransmit and timeout retransmit, after several continuous fast retransmit, the broken path can be closed normally.

This invention is mainly applied to CMT with a large difference between paths performance, such as both wired and wireless condition in application analysis. The worse a path performance is, the more necessary it is for the paths to point out lost packets mutually. It helps the system to find a lost packet faster and trigger fast retransmit. The larger the difference between paths performance is, the more necessary it is to avoid unnecessary fast retransmit, and the more obvious the effect of improved fast retransmit mechanism is. This invention is an implementation scheme of Concurrent Multipath Transfer which mainly aims at instable network environment and paths group of great difference.

The invention claimed is:

1. A method of Concurrent Multipath Transfer (CMT) which is based on the relational paths, comprising the steps of:
   (a) initializing a sending timer of a packet and clearing a flag of fast retransmit before sending the packet;
   (b) sending the packet in one of several paths having differing performance characteristics and opening the sending timer of the packet;
   (c) increasing a lost report counter of the packet if receiving a gap report of the packet from any one of said paths having differing performance characteristics by the following packets which arrive receiver before the packet;
   (d) setting the flag of fast retransmit if the sending timer of the packet expires;
   (e) retransmitting the packet if the lost report counter is larger than a threshold and the flag of fast retransmit is set;
   (f) increasing a continuous fast retransmit counter after fast retransmit; and
   (g) processing a timeout of sending in TCP's Retransmission Timeout Mechanism if value of continuous fast retransmit counter is bigger than 0 and is multiples of 3.

2. The method of claim 1, characterized in that once a received SACK contains the gap report, it is to find the Transmission Sequence Number (TSN) of the lost packet which is pointed out in the gap report, and then to increase the lost report counter of this packet directly.

3. The method of claim 1, characterized in that the sending timer is added for each packet, and a sending timer is recorded before packet is acknowledged;
   only when the sending timer of a packet is expired, it considered that the packet may be lost; and the value of sending timer expired is set to be proportional to the average of Round-Trip Time of this sending path.

4. The method of claim 1, characterized in that the step (a) further comprises clearing a flag of gap report of same path; the step (c) further comprises set the flag of gap report of the same path if the gap report is sent from the path; in the retransmit of step (e), switch to other path to retransmit the packet if the flag of gap report of same path is set.

* * * * *